(12) United States Patent
Cozine (10) Patent No.: US 12,221,226 B2
(45) Date of Patent: Feb. 11, 2025

(54) CONTACTLESS POWER GENERATOR FOR POWERING LIGHTS ON A PROPELLER

(71) Applicant: Textron Aviation Inc., Wichita, KS (US)

(72) Inventor: Brian T. Cozine, Kechi, KS (US)

(73) Assignee: Textron Aviation Inc., Wichita, KS (US)

( * ) Notice: Subject to any disclaimer, the term of this patent is extended or adjusted under 35 U.S.C. 154(b) by 0 days.

(21) Appl. No.: 18/627,713

(22) Filed: Apr. 5, 2024

(65) Prior Publication Data

US 2024/0336371 A1    Oct. 10, 2024

Related U.S. Application Data

(60) Provisional application No. 63/494,504, filed on Apr. 6, 2023.

(51) Int. Cl.
| | |
|---|---|
| *B64D 47/06* | (2006.01) |
| *B64C 11/00* | (2006.01) |
| *B64D 41/00* | (2006.01) |
| *F21S 9/04* | (2006.01) |
| *F21W 107/30* | (2018.01) |
| *H02G 1/06* | (2006.01) |
| *H02G 3/22* | (2006.01) |
| *H02K 99/00* | (2014.01) |

(52) U.S. Cl.
CPC .............. *B64D 47/06* (2013.01); *B64C 11/00* (2013.01); *B64D 41/00* (2013.01); *F21S 9/04* (2013.01); *H02G 1/06* (2013.01); *H02G 3/22* (2013.01); *H02K 99/10* (2016.11); *B64D 2203/00* (2013.01); *F21W 2107/30* (2018.01)

(58) Field of Classification Search
CPC ....... F21S 9/04; F21W 2107/30; B64D 47/02; B64D 47/04; B64D 47/06; B64D 2203/00
See application file for complete search history.

(56) References Cited

U.S. PATENT DOCUMENTS

| | | | | |
|---|---|---|---|---|
| 2,555,807 | A  * | 6/1951 | Morris | B64D 47/06 290/55 |
| 6,048,172 | A  * | 4/2000 | Pniel | H05B 47/105 340/946 |
| 7,081,828 | B2 | 7/2006 | Low | |
| 8,411,108 | B2 | 4/2013 | Gilbert et al. | |
| 10,875,664 | B1 * | 12/2020 | Maver | B64D 47/02 |
| 2006/0049302 | A1 * | 3/2006 | Kennedy | B64C 27/72 244/17.11 |
| 2006/0284736 | A1 * | 12/2006 | Low | G09G 3/005 340/961 |
| 2008/0225536 | A1 * | 9/2008 | Landry | B64D 47/06 416/5 |
| 2011/0058945 | A1 | 3/2011 | Hu | |

(Continued)

*Primary Examiner* — Alexander K Garlen
(74) *Attorney, Agent, or Firm* — Avek IP, LLC (57) ABSTRACT

A system and a method for contactless power generation for a lighting arrangement configured on an aircraft propeller. Power is produced when a magnetic field produced by an arrangement of magnets on an airframe magnetically interacts with coils configured on an aircraft propeller. When the propeller spins, rotation of the mounted coils through the magnetic fields of the magnets generate power. Electrical wiring carrying charge from the coils to the lights is laid into grooves formed in propeller blades which connect to lights inserted in formed sockets.

16 Claims, 6 Drawing Sheets

(56) References Cited

U.S. PATENT DOCUMENTS

2016/0362193 A1* 12/2016 Bemis .................... B64C 11/16
2017/0237369 A1*  8/2017 Becker .................. B64D 41/00
                                                        416/5

* cited by examiner

CONTACTLESS POWER GENERATOR FOR POWERING LIGHTS ON A PROPELLER

CROSS-REFERENCE TO RELATED APPLICATIONS

This application claims the benefit of U.S. Provisional Patent Application No. 63/494,504, filed Apr. 6, 2023, the entire contents thereof are herein incorporated by reference.

BACKGROUND OF THE INVENTION

1. Field

The disclosed embodiments relate generally to the field of power supply to a spinning apparatus on aircraft. More specifically, the disclosed embodiments relate to the process of contactless energy generation with delivery to power low power applications on moving, e.g., rotating, devices on aircraft.

2. Description of the Related Art

It is known to illuminate propeller blades of an aircraft from a power supply. For example, U.S. Pat. No. 7,081,828 to Low discloses a power supply generating energy from rotational movement of a propeller.

Vehicles are also known to have been outfitted with lighting arrangements. For example, U.S. Pat. No. 8,411,108 to Gilbert et al. discloses power supply to a rotating wheel assembly via a magnetic field of a transformer from a fixed part of the motor vehicle to a second transformer coil.

Other rotating components such as fan blades have also been outfitted with lighting arrangements. For example, U.S. Patent Application Publication No. 2011/0058945 to Hu discloses a lighting arrangement placed on fan blades powered from the rotation of the blades. Hu also discloses the usage of magnets and coils within encasements along the inner diameter of the fan blades to generate power.

Alternatively power supply is also generated for lighting components on propeller blades using slip rings and brushes. For example, U.S. Patent Application Publication No. 2016/0362193 to Bemis discloses lighting fixtures on propellers powered by a slip ring connector arrangement.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a contactless power generation system for an aircraft lighting arrangement, the power generation system including: at least one magnet configured on a stationary aircraft structure; at least one coil mounted on an aircraft apparatus and configured to have an electrical current generated using the magnet upon rotation of the aircraft apparatus; and an electrical connection electrically connecting the coil to a lighting arrangement existing on a portion of the aircraft apparatus.

In some embodiments, the techniques described herein relate to a system wherein the aircraft apparatus is a propeller.

In some embodiments, the techniques described herein relate to a system wherein the coil is mounted to a propeller hub.

In some embodiments, the techniques described herein relate to a system wherein the magnet is mounted to a cowl.

In some embodiments, the techniques described herein relate to a system wherein the electrical connection is inlaid into a groove formed in the propeller.

In some embodiments, the techniques described herein relate to a system wherein the groove is formed into a forward facing surface of a blade of the propeller.

In some embodiments, the techniques described herein relate to a system including a first socket formed into a forward facing surface of a blade tip and a second socket formed into a rear facing surface of the blade tip.

In some embodiments, the techniques described herein relate to a system wherein the lighting arrangement includes a first lighting component incorporated into the first socket and a second lighting component incorporated into the second socket.

In some embodiments, the techniques described herein relate to a system including a through hole which extends from the first socket to the second socket and is configured to allow for electrical connection between the first lighting component and the second lighting component.

In some embodiments, the techniques described herein relate to a system including a filling agent applied over the electrical connection inlaid in the groove.

In some embodiments, the techniques described herein relate to a method for powering a lighting system in an aircraft propeller, the method including: mounting a coil into the propeller; incorporating a magnet into a stationary aircraft structure of the aircraft across from the coil; and connecting the coil to the lighting system on the aircraft propeller to power the lighting system using an electrical conduit.

In some embodiments, the techniques described herein relate to a method including: forming a groove into a surface of a blade of the propeller to receive the electrical conduit; forming a first socket proximate an outer area of the propeller blade to receive at least a portion of the lighting system; and covering the groove and the first socket with a filling agent.

In some embodiments, the techniques described herein relate to a method including forming the groove near a trailing edge of a front facing surface of the blade.

In some embodiments, the techniques described herein relate to a method including using an epoxy as the filling agent.

In some embodiments, the techniques described herein relate to a method including forming the first socket into a front facing surface of a propeller tip.

In some embodiments, the techniques described herein relate to a method including: forming a second socket into a rear facing surface of the propeller tip, and including independent LED light sources in each of the first socket and second socket.

In some embodiments, the techniques described herein relate to an aircraft lighting system including: a coil mounted onto an aircraft propeller; a magnet mounted onto stationary aircraft structure across from the coil; a first light source formed into the aircraft propeller; and an electrical connection established between the coil and the first light source.

In some embodiments, the techniques described herein relate to a system including a groove formed into a blade surface on the aircraft propeller, the groove configured to house the electrical connection.

In some embodiments, the techniques described herein relate to a system wherein the first light source is configured to emit light having a different color than is emitted from a second light source formed into the aircraft propeller.

In some embodiments, the techniques described herein relate to a system wherein the groove is formed into a front facing surface of the aircraft propeller.

BRIEF DESCRIPTION OF THE SEVERAL VIEWS OF THE DRAWINGS

Illustrative embodiments are described in detail below with reference to the attached drawing figures, which are incorporated by reference herein and wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments disclosed herein provide systems and a method for contactlessly providing power to a lighting arrangement configured on an aircraft propeller. In embodiments, power is generated without a touching or sliding interface. Power is produced when a magnetic field produced by an arrangement of magnets on an airframe or cowl magnetically interacts with coils configured on a propeller or propeller hub. When the propeller spins, rotation of the mounted coils through the magnetic fields of stationary magnets on the airframe generate power as electrons within the coils are moved by the changing magnetic fields. In disclosed embodiments, the movement of coils past the stationary magnets acts as a generator and provides electrical power to lights configured on the propeller blades anytime the propeller is spinning. Illumination on spinning propellers improves aircraft safety by increasing the visibility of the propeller to individuals positioned near or within the aircraft.

A contactless power generation system established between the aircraft frame and rotatable propeller is advantageous because it eliminates the need for a physical connection. A physical connection is suboptimal because of the difficulty created in making a wired connection from a stationary element and a rotating element such as an aircraft and its propeller.

In embodiments, the usage of magnets and coils eliminates the need for contact between an airframe or cowl and a rotatable hub or propeller. Current methods include the usage of slip rings and brushes that generate power when propeller rotation moves slip rings against stationary brushes to create power which is transferred from the aircraft to the spinning propeller. Consequently, brushes and slip rings wear and degrade from use and must be replaced periodically. Alternatively, current methods include using batteries to power a light arrangement on a propeller, but batteries must be replaced periodically and could become exhausted midflight making the light arrangement nonoperational.

In spinning apparatuses, the movement of coils past magnets produces power. Power is generated because coils may be fabricated from metals which are known electrical conductors. Metals conduct and transfer electricity due to high concentrations of electrons which exist within the metal. Magnets, meanwhile, have two opposite north and south poles created from atoms moving in different directions within the magnet. As coils are moved past stationary magnets, due to rotor motion, power is generated as electrons in the coil are activated by the changing magnetic field produced from spaced magnets. This motion creates electromagnetic flux (e.g., movement of electrons) in the coil which creates electromotive force. The electromotive force produces alternating current (AC) within the coil which may be used as power.

In disclosed embodiments, the AC in the coils is supplied to a full bridge rectifier to transform the AC into full wave direct current (DC).

The DC current obtained is then supplied to charge a capacitor which is an element capable of storing electric energy. The capacitor can then supply a voltage regulator capable of supplying appropriate voltage to power imbedded light emitting diode (LED) elements visible on the surfaces of the propeller blades. The LED elements are capable of emitting light to illuminate the propeller.

Figure 1:
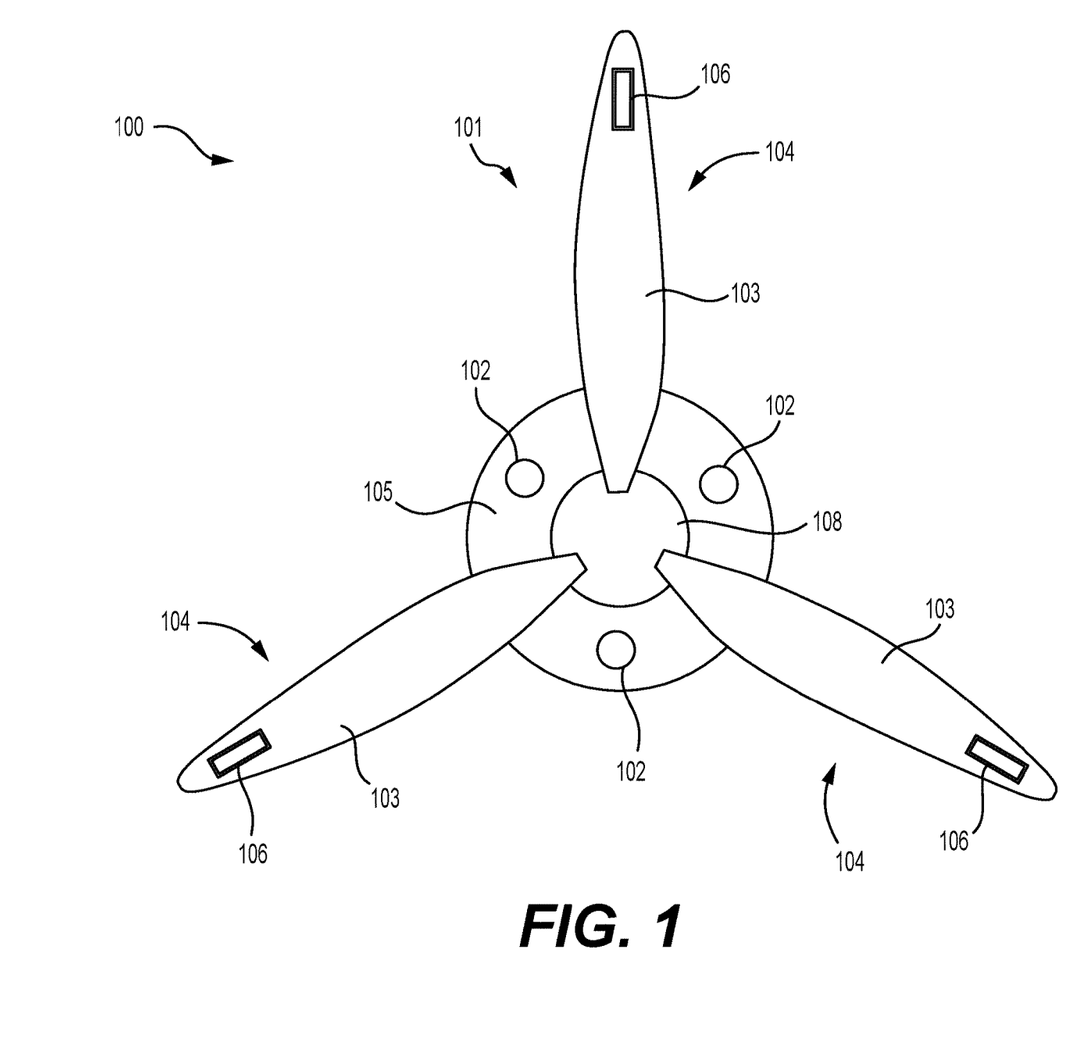
FIG. 1 is a front view of an aircraft blade hub and propeller configured with a contactless power generator for powering lights on the propeller in an embodiment.
Figure 2:
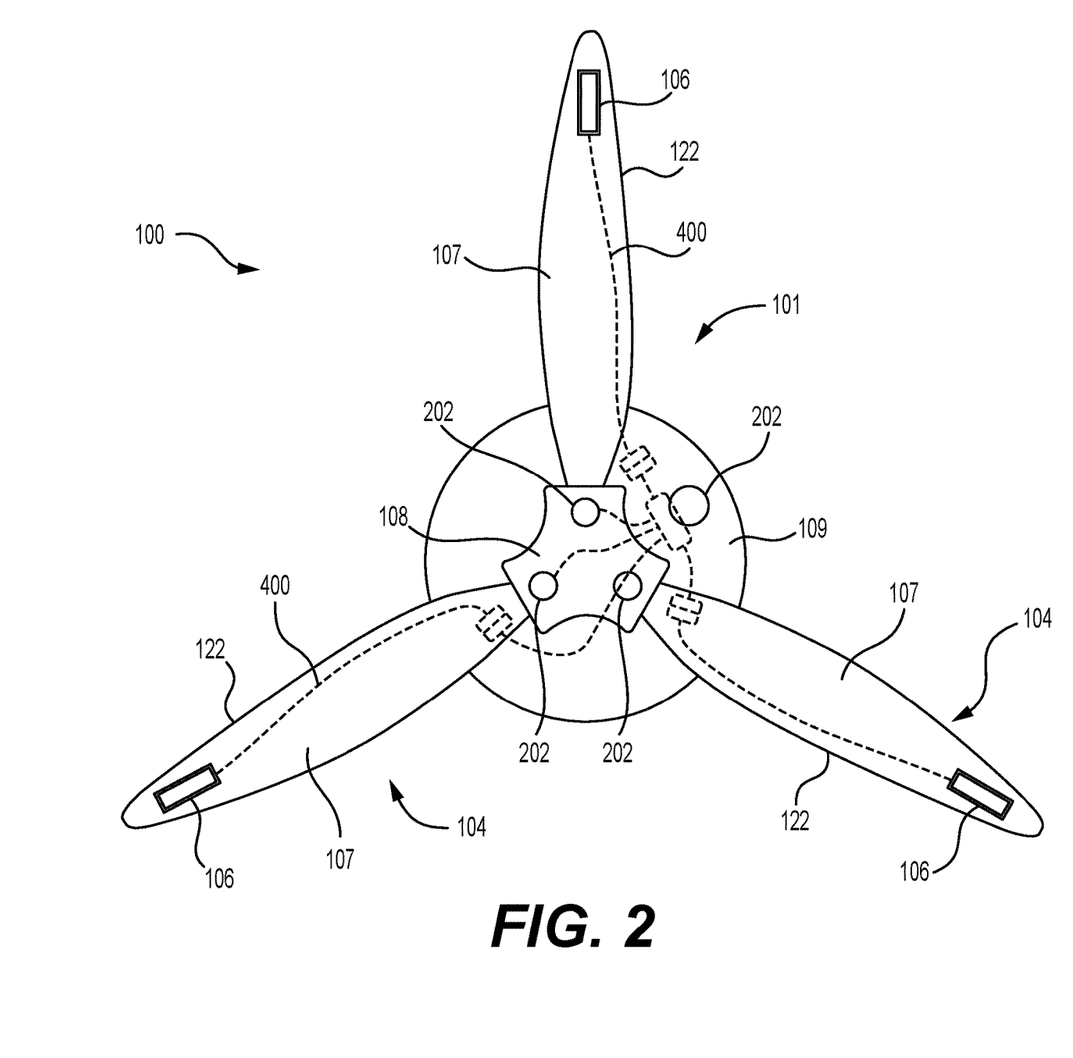
FIG. 2 is a rear view of the aircraft propeller of FIG. 1 showing lighting arrangements configured on a back facing portion of the propeller in embodiments.

With reference to FIG. 1, which shows a forward facing surface 103 of a propeller 101, embodiments include a contactless power generating system 100 capable of generating power for a lighting arrangement 106 on an aircraft propeller 101. Magnets 102 are configured on an outer surface of the aircraft frame, which in embodiments is the cowl 105. The cowl 105 is a stationary piece of aircraft structure which is configured to allow a propeller hub 108 to rotate with propeller 101. The magnets 102 are incorporated and configured such that a magnetic field projected from each magnet 102 is substantially directed towards the propeller 101. In embodiments, three magnets 102 are shown on the cowl 105, in other embodiments at least one magnet 102 may be configured on the cowl 105 or other stationary aircraft structure such that a magnetic field produced from the magnet 102 is substantially directed towards a rotatable apparatus on an aircraft. Magnets 102 may optionally be placed with its north or south pole directed towards the aircraft propeller 101 and propeller blades 104. Specifically, placement of the magnets 102 in other embodiments could optionally be on any stationary location allowing for the magnetic field of each magnet 102 to influence electrons within coils 202 (FIG. 2). A lighting arrangement 106 is shown within a socket 126 near the tip of each of three blades 104 of propeller 101. In embodiments, the lighting arrangement 106 may be configured with one or many light emitting diodes (LEDs) or other illuminative lighting fixtures. The lighting arrangement 106 is placed within a cavity which may be a socket 126 formed into the blade 104, near the blade tip such that the lighting arrangement 106 matches the curvature of blade 104. In embodiments, lighting arrangement 106 may be formed with a curvature to match the aerodynamic curve of a blade 104. In some embodiments, lighting arrangement 106 may not be configured onto each blade 104 of propeller 101 and in other embodiments may be configured on numerous different propellers having different numbers of blades 104.

Figure 3:
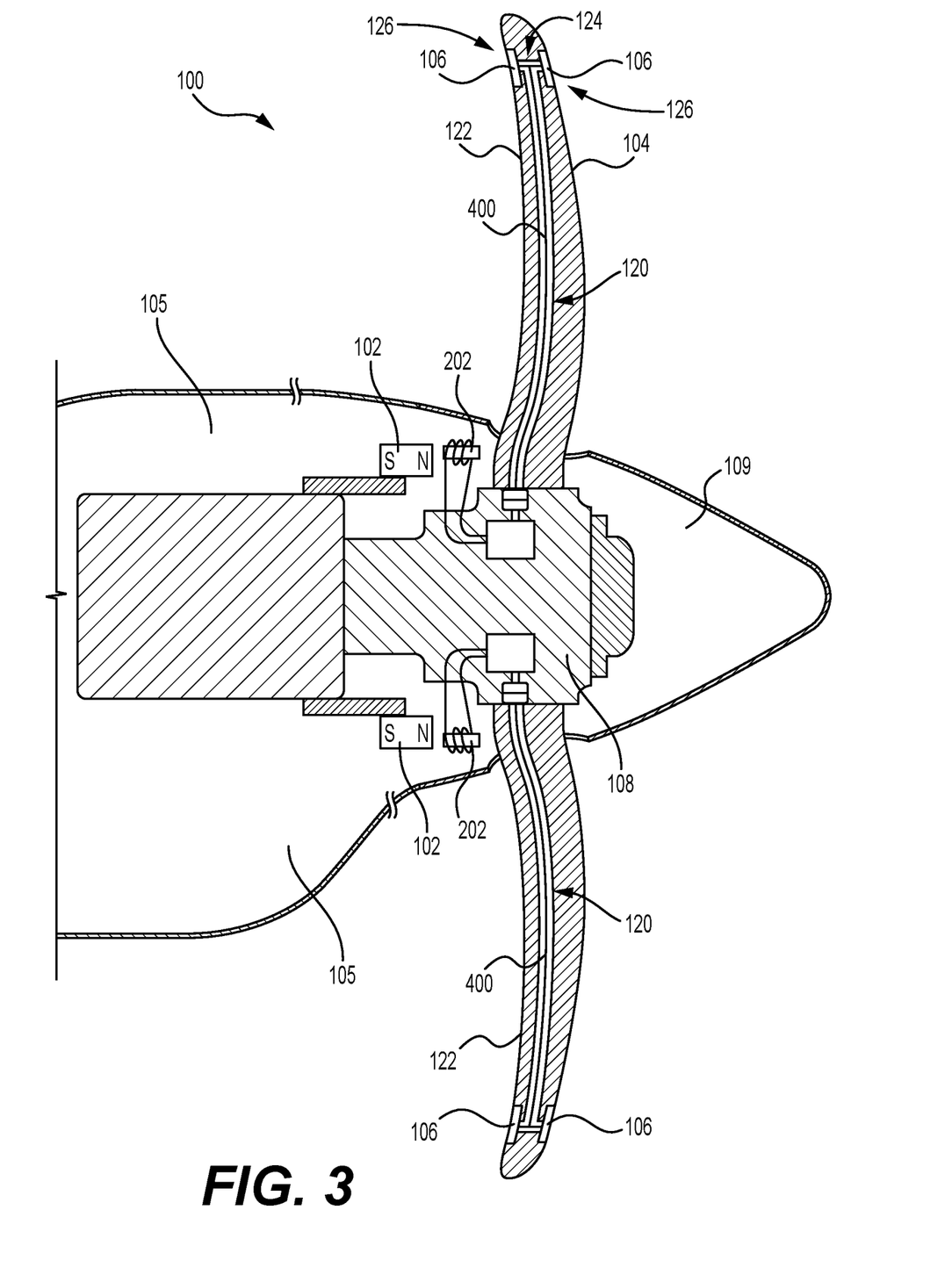
FIG. 3 is a cross sectional view of an aircraft propeller installed on an aircraft revealing lighting arrangements on the front and back facing portions of the propeller, in embodiments.
Figure 4:
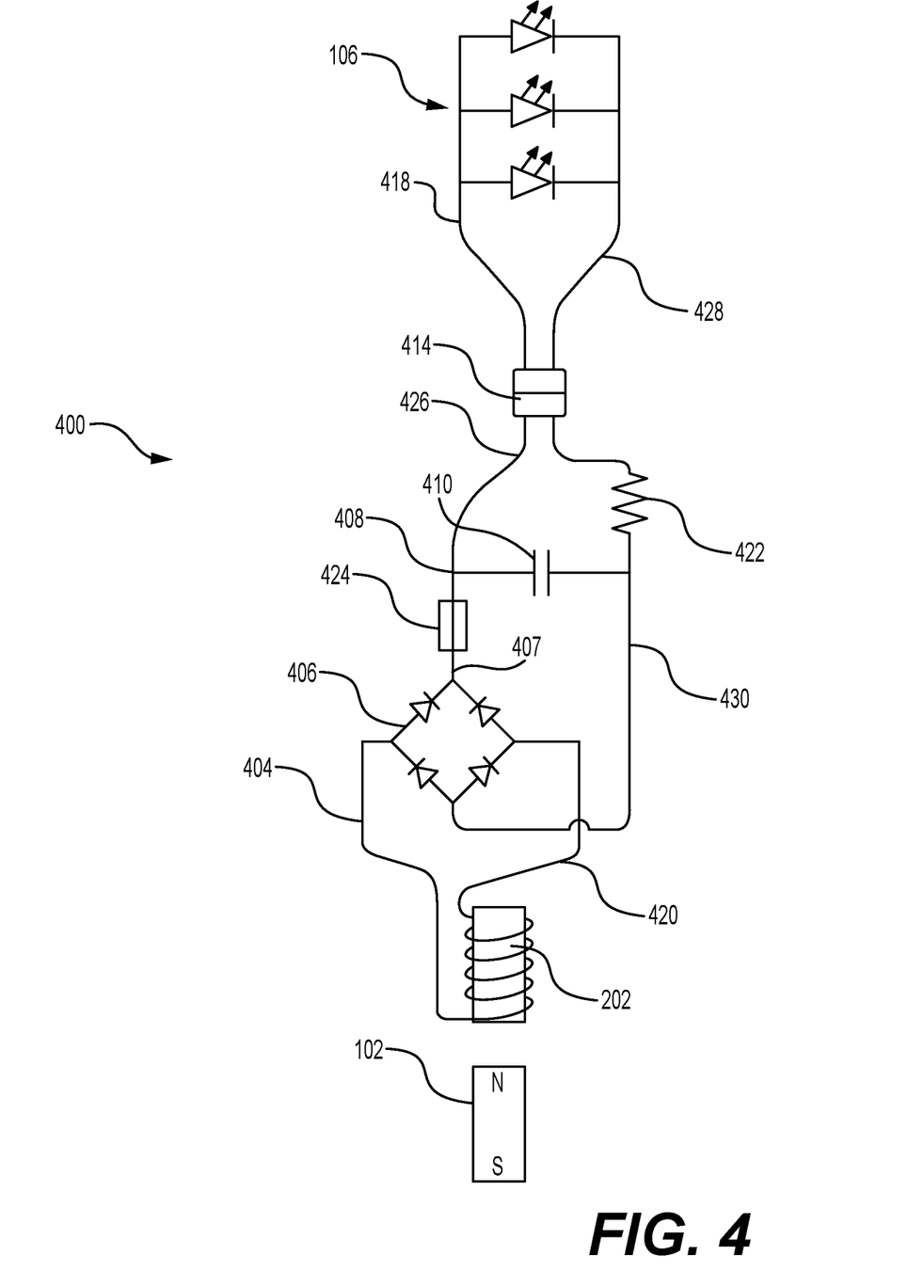
FIG. 4 is a schematic of an electrical current flow, in embodiments, showing electrical components used in providing power to the lighting arrangements of FIG. 2.
Figure 5:
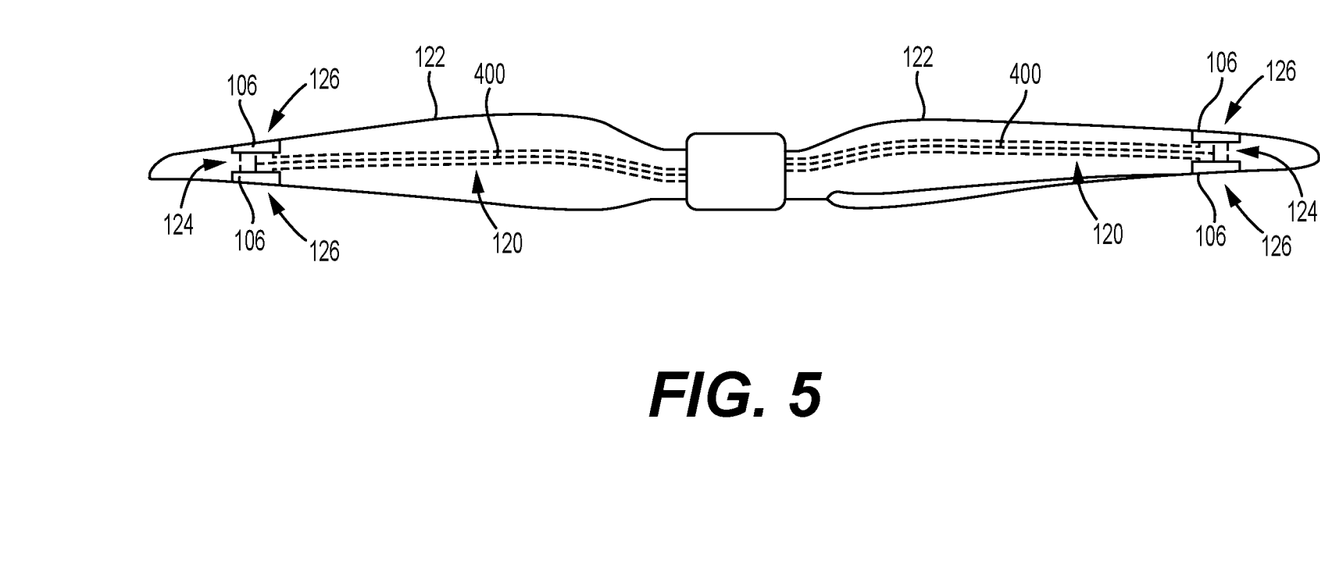
FIG. 5 is a cross sectional view of an aircraft propeller.

FIG. 2 shows a rear facing surface 107 of the propeller 101. The aircraft propeller 101 includes lighting arrangements 106 configured and positioned on the rear facing surface of the blades 104 which opposes the forward facing surface 103 shown in FIG. 1. The coils 202 are configured onto the propeller 101 which rotates relative to stationary cowl 105. In embodiments, the propeller 101, propeller hub 108, and spinner shell 109 are configured to rotate together. In the embodiment shown in FIG. 2, coils 202 are incorporated onto the propeller hub 108. In some embodiments the coils 202 may be incorporated onto propeller 101 and/or blades 104, or the spinner shell 109. Coils 202 are substantially positioned to extend in the direction across from the stationary magnets 102 (and projected magnetic fields) located on the cowl 105 which may be seen in FIG. 1. In embodiments, three coils 202 are shown attached to the rotatable propeller hub 108 and in other embodiments at least one coil 202 may be configured on a rotatable component of the aircraft structure. Lighting arrangement 106 is connected to coils 202 using electrical network 400 which includes electrical components and conduits (see FIG. 4) capable of supplying electrical energy from the coil 202 to lighting arrangement 106. In embodiments, electrical network 400 is configured with conduit to connect from each lighting arrangement 106 to each coil 202. The network 400, with reference to FIGS. 3 and 5, is hidden within each propeller blade 104 configured with a lighting arrangement 106 and is shown in FIG. 4 to provide illustration of connection between lighting arrangements 106 and coils 202. In embodiments, lighting arrangements 106 exist on the rear facing surface 107 (FIG. 2), and forward facing surface 103 (FIG. 1) of the propeller blade(s) 104, and in other embodiments, lighting arrangements 106 may be configured on one surface or the other. Lighting arrangements 106 configured on the rear facing surface 107 of blades 104 substantially face the cockpit, and therefore the diodes may be fewer in count and possibly emit lower levels of visible light than the lighting arrangements 106 configured on the forward facing surface 103 of blades 104 to comply with aircraft standards so as to not impede vision of the pilot. In some embodiments, the lighting arrangement 106 configured on the rear facing surface 107 faced towards the cockpit may emit dim, red colored light. The lighting arrangement 106 on the rear facing surface 107 is placed into a socket 126 formed into blade 104 to match the curvature of blade 104 much like the lighting arrangement 106 on the forward facing surface 103.

FIG. 3 discloses a cross sectional view of the propeller 101 and blade 104 such that both the front surface 103 and back surface 107 of the blade 104 are revealed along with the inside of a blade 104. In embodiments, a magnet 102 is incorporated onto the cowl 105 with its north pole facing towards the propeller 101 across from a coil 202 mounted to the propeller hub 108. In some embodiments, the coils 202 may be mounted to the spinner shell 109. In some embodiments, some magnets 102 can be oriented with the north pole directed towards the coils 202 and other magnets 102 oriented with the south pole directed towards the coils 202. In other embodiments, the magnets 102 can be oriented with the same pole directed towards the coils 202. Regardless of pole orientation, magnets 102 will put the electrons in coils 202 in flux when the coils 202 are passed through the magnetic fields of north and south pole facing magnets 102. Flux of electrons in the coils 202 may be used for power generation. In embodiments, magnet 102 is radially spaced a distance away from the center axis of the propeller (i.e. the center of propeller hub 108) such that the speed of rotation of the coil 202 relative to the stationary magnet 102 is sufficient to generate the desired flux of electrons. A radial position on the propeller 101 is established by the positioning of the magnet 102 across from the coil 202 such that the rapid rotations of the propeller 101 result in the necessary interaction of the opposing stationary magnets 102, and rotating coils 202. In embodiments, the magnets 102 are positioned apart such that magnetic fields projected from each magnet 102 are separated from one another when the coil 202 is rotated within range of the fields. Doing so allows for the electrons in the coils 202 to move when passing between areas of low magnetism to areas of high magnetism.

The propeller blades 104 are equipped with light arrangement 106 capable of emitting visible light. It should be noted that the count, location, strength, shape, and size of each lighting arrangement 106 can vary on each blade 104 based upon desired visibility and aircraft propeller blade 104 count and structure. The lighting arrangements 106 could exist on all or some of the blades 104. In some embodiments, higher counts and brighter diodes of lighting arrangement 106 may be positioned on the forward facing surface 103 of the blade 104 when compared with light arrangements 106 positioned on the rear facing surface 107 of blade 104 to reduce possible vision reduction from the cockpit. The lighting arrangements 106 on both the front facing surface 103 and rear facing surface 107 are configured to be installed into formed recesses or sockets 126 in propeller blades 104. The formed recesses prevent lighting arrangements 106 from protruding out from blade 104 and allow lighting arrangements 106 to match the curvature of blade 104. This allows blade 104 to maintain its aerodynamic curvature and shape. The magnets 102 may also vary in count, location, strength, shape, and size based upon the aircraft frame, propeller structure, and blade 104 count.

When the propeller 101 begins spinning, power is able to be generated when coils 202 are rotated past the magnets 102. As the propeller blades 104 spin, the coils 202 mounted to hub 108 or optionally blades 104 pass within the magnetic field of the stationary magnets 102. The coils 202 experience electromagnetic flux as electrons within the coils 202 are activated by the changing magnetic field created each time a coil 202 moves past a magnet 102. For instance, in embodiments, when coils 202 are rotated either clockwise or counterclockwise (possibly based on the design of the propeller), the magnetic field of a north pole-oriented magnet 102 may attract and move the electrons in the coil 202. As the coil 202 passes out of the magnetic field of the magnet 102 the electrons move once more. As the coil 202 continues rotating, the magnetic field of a south pole-oriented magnet 102 may repel and move the electrons in the coil 202. This movement of electrons creates electrical current within the coils 202.

FIG. 4 shows electrical network 400 in which coils 202 may transfer current through connected electrical components to provide power to the lighting arrangements 106. In embodiments, the current in the coils 202 is transferred through electrical connections 404 and 420 to a rectifier 406. In embodiments, current supplied to rectifier 406 is AC because of the continuously changing magnetic field (i.e. north pole and south pole directed magnetic fields) created from the magnets 102.

A rectifier is a known electrical device which converts an AC current into a DC current by allowing a current to flow through it in one direction only. The rectifier operates using four diodes to reverse the direction of both sides of the AC pulse. The DC continues to oscillate from zero to a peak value and feeds the power to a DC output as half wave. The AC current is connected to a node between the nonconductive side of one diode and the conductive side of another diode. This allows the diodes to pass negative or positive AC current to the four-diode chain discussed above which creates the needed DC current flow.

Connections 404 and 420 are connected to opposite ends of coil 202 such that both positive and negative current is supplied to the rectifier 406. Within the rectifier 406 the AC current is transformed into DC current. DC current proceeds to a fuse 424 using electric connection 407. From the fuse the current reaches a tee 408 which directs current either to a capacitor 410 or to a plug connector 414. From the capacitor 410, current travels through connection 430 back to the rectifier 406 to effectively close the circuit. In embodiments, capacitor 410 stores energy and can smooth pulses in energy resulting from the magnets 102 moving past coils 202. Current not flowing to the capacitor 410 continues via connection 426 to the plug connector 414. From the plug connector 414, the current continues with necessary voltage to lighting arrangement 106 using connection 418. With appropriate voltage, lighting arrangement 106 may emit visible light which may illuminate the propeller blade(s) 104 and substantially increases the visibility of the rotating propeller 101. From the lighting arrangement 106, remaining current may travel via connection 430 back through the plug connector 414. The power then continues through connection 428 to a resistor 422. From resistor 422, current proceeds to connection 430 which proceeds to the rectifier 406 closing the circuit. The electrical elements and connections in network 400 may vary in both count, order, and location. The electrical network 400 may also require other electrical connections or elements not shown in network 400 that may be necessary to enable sufficient power supply to the lighting arrangement 106.

The securement and precise location of the electrical network 400 and lighting arrangement 106 in embodiments are configured strategically to maintain the structural integrity of the propeller 101 and hub 108. Various location arrangements and possible securement methods may be used depending on the structure of the aircraft, specifically the hub 108, propeller 101, and blades 104. In embodiments, the components of network 400 may be secured and housed in the hub 108 with connective wires and conduits extending through the propeller blade 104 to the lighting arrangement 106 in a groove 120 (FIGS. 3 and 5). The wiring or conduit from the electrical network 400 may be inlaid into the groove 120 and covered over with an epoxy, paint, or other filling agent. More specifically, the wire connections 418 and 428 providing electrical connection to the lighting arrangement 106 are laid into groove 120. In embodiments, groove 120 is formed into the front facing surface 103 of the trailing edge 122 of blade 104. Forming the groove 120 into the front facing surface 103 at the trailing edge 122 is strategic because this portion of the propeller blade 104 is substantially less exposed to debris than other portions of blade 104. Additionally, this region of the propeller 101 is under lower stress loads than other regions of the propeller 101 such that forming groove 120 does not impact the structural integrity of the propeller. Wires and conduits are secured and substantially hidden within propeller blade 104 by forming the groove 120 into the propeller blades 104. In embodiments after a wire is inlaid into groove 120 an epoxy is applied over the inlaid wire/conduit and effectively hides and covers groove 120. The epoxy is then sanded down to match the loft and airfoil of blade 104. Covering over groove 120 with epoxy or another filling agent is advantageous in that the wiring is able to be replaced by removing the epoxy versus replacing the entire propeller assembly when wiring needs replaced. Optionally, a channel may be formed into propeller 101 such that the wiring (specifically wire connections 418 and 428 which connect directly to lighting arrangement 106) from network 400 may be fed through and connected to lighting arrangement 106. Storage of the electrical components of electrical network 400 (i.e. rectifier 406, capacitor 410, and plug connector 414) in the hub 108 may be advantageous due to the protection provided by the spinner shell 109 while remaining internal to the aerodynamic shape of the aircraft. In this way, electrical connections of network 400 may be secured and hidden within the propeller allowing for negligible added air resistance and protection from external forces. Optionally, the components of network 400 could be secured within possible channels or groove 120 of propeller blade 104 using clips or other known devices to secure the network 400 within blades 104. In embodiments, lighting arrangements 106 may be formed into the blades 104 on both faces of blade 104 and secured into formed recesses near the ends of each blade 104 as described above. In embodiments, a through hole 124 is formed in between the opposed lighting arrangements 106 such that lighting arrangements 106 may be electrically wired together. The blade 104 may be manufactured to contain sockets where individual LED diodes could be fastened within the propeller 104 such that the LED bulbs do not protrude above the surface of the blade 104. The lighting arrangement 106 could be secured using clips in the sockets 126 of the blade 104. In embodiments, the propeller 101 may be fabricated from a composite material and in other embodiments propeller 101 may be fabricated from Aluminum. When fabricating the propeller 101 from a composite material, groove 120, through hole 124, and sockets 126 may be formed when manufacturing the propeller 101. The contactless power generating system 100 may be implemented into propellers 101 already manufactured and propeller 101 already in use by using appropriate tools to form sockets 126, groove 120, and through hole 124 into blades 104.

Figure 6:
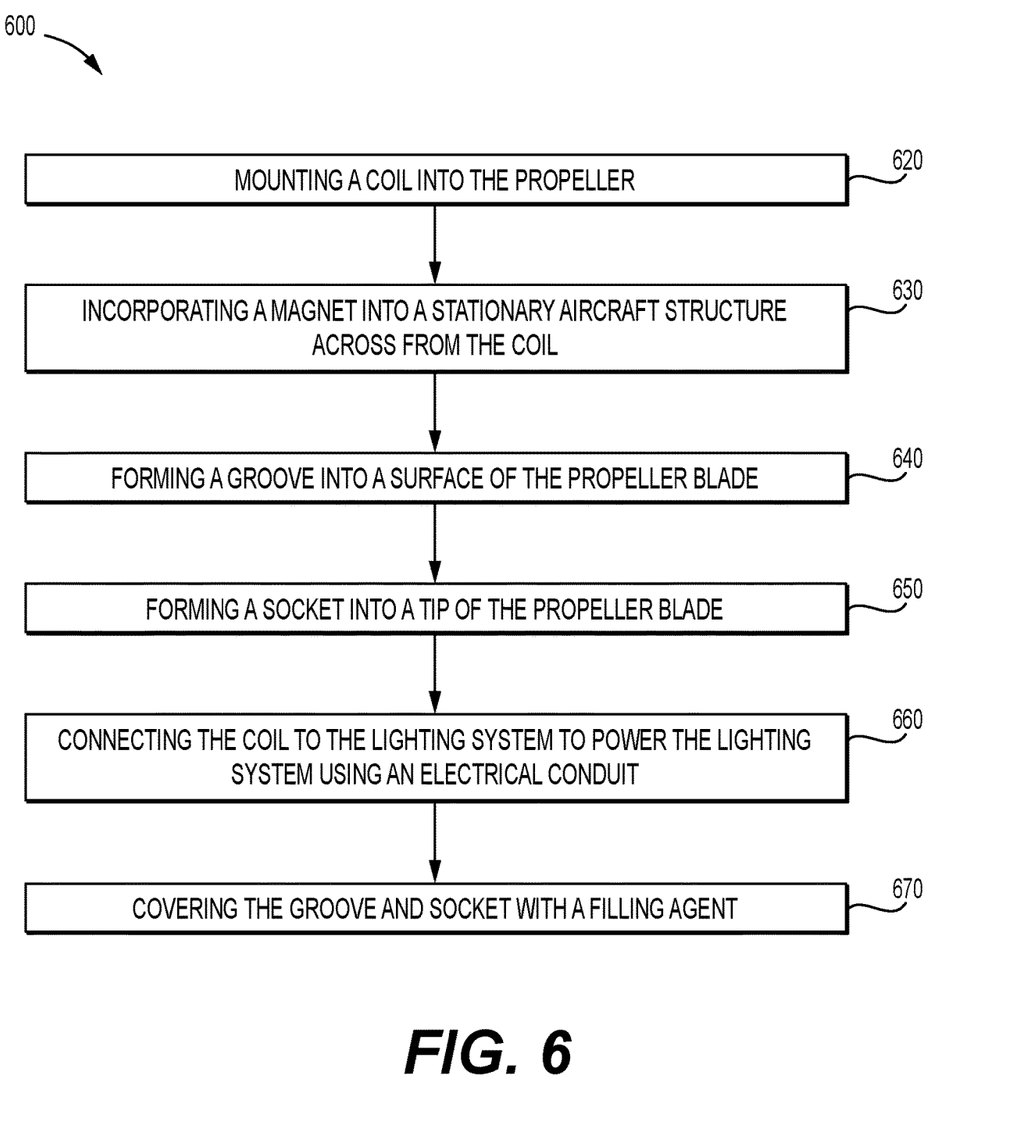
FIG. 6 is a method for having a contactless power generator for powering lights on a propeller.

FIG. 6 provides an example of a method 600 for powering a lighting system in an aircraft propeller. The method 600 comprises having a propeller 101 and/or blade 104 for a rotatable aircraft apparatus. In embodiments, the rotatable aircraft apparatus may be a propeller hub 108 and propeller 101. In some embodiments, the propeller 101 may be fabricated from composite or aluminum materials.

At step 620, the method 600 comprises mounting a coil into a propeller. In embodiments, coil 202 is mounted onto the propeller hub 108 which may be a component of the propeller 101. The number of coils used may vary in embodiments.

At step 630, the method 600 comprises incorporating a magnet into a stationary aircraft structure across from the coil. In embodiments, magnets 102 are mounted onto a cowl 105 of the aircraft and positioned to project their magnetic field towards coils 202. The number of magnets used may vary in embodiments.

At step 640, the method 600 comprises forming a groove into a surface of the propeller blade. In embodiments, groove 120 is formed into a forward facing surface 103 of blade 104 near the propeller 101 trailing edge 122.

At step 650, the method 600 comprises forming a socket into a tip of the propeller blade. In embodiments, a socket 126 is formed into front facing surface 103 and rear facing surface 107 at the propeller blade tip. A through hole 124 is formed between sockets 126.

At step 660, the method 600 comprises connecting the coil to the lighting system using an electrical conduit. In embodiments, the lighting arrangement 106, which may include at least one light emitting diode is inserted into the socket 126, and electrical wiring of electrical network 400 is inserted into the groove 120 to establish an electrical connection between the coil 202 and the light emitting diode.

At step 670, the method 600 comprises applying a filling agent over the electrical wiring and groove. In embodiments, epoxy is used to cover the electrical network 400 in groove 120. The epoxy is sanded and smoothed to match the curvature and airfoil of blade 104.

The disclosed embodiments may also be implemented on other forms of rotating apparatuses on aircraft such as aircraft equipped with vertical takeoff and landing (VTOL) capabilities like a helicopter. The disclosed methods and systems used for power generation and connection for lighting arrangements on horizontal takeoff and landing aircraft may be configured with VTOL blades.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A contactless power generation system for an aircraft lighting arrangement, the power generation system comprising: at least one magnet configured on a stationary aircraft structure; at least one coil mounted on an aircraft apparatus, the coil generating an electrical current using the magnet upon rotation of the aircraft apparatus; an electrical connection electrically connecting the coil to a lighting arrangement existing on a portion of the aircraft apparatus; a first socket formed into a forward facing surface of a blade tip of the aircraft apparatus, and a second socket formed into a rear facing surface of the blade tip, wherein the lighting arrangement includes a first lighting component incorporated into the first socket and a second lighting component incorporated into the second socket.

2. The system of claim 1 wherein the aircraft apparatus is a propeller.

3. The system of claim 1 wherein the coil is mounted to a propeller hub.

4. The system of claim 1 wherein the magnet is mounted to a cowl.

5. The system of claim 2 wherein the electrical connection is inlaid into a groove formed in the propeller.

6. The system of claim 5 wherein the groove is formed into a forward facing surface of a blade of the propeller.

7. The system of claim 1 comprising a through hole which extends from the first socket to the second socket and is configured to allow for electrical connection between the first lighting component and the second lighting component.

8. The system of claim 6 comprising a filling agent applied over the electrical connection inlaid in the groove.

9. A method for powering a lighting system in an aircraft propeller, the method comprising: mounting a coil into the propeller; incorporating a magnet into a stationary aircraft structure of the aircraft across from the coil; connecting the coil to the lighting system on the aircraft propeller to power the lighting system using an electrical conduit; forming the first socket into a front facing surface of a propeller tip, forming a second socket into a rear facing surface of the propeller tip, and forming the lighting system including independent LED light sources in each of the first socket and the second socket.

10. The method of claim 9 comprising:
forming a groove into a surface of a blade of the propeller to receive the electrical conduit;
forming a first socket proximate an outer area of the propeller blade to receive at least a portion of the lighting system; and
covering the groove and the first socket with a filling agent.

11. The method of claim 10 comprising forming the groove near a trailing edge of a front facing surface of the blade.

12. The method of claim 10 comprising using an epoxy as the filling agent.

13. An aircraft lighting system comprising: a coil mounted onto an aircraft propeller; a magnet mounted onto stationary aircraft structure across from the coil; a first light source formed into a front facing surface of a blade tip of the aircraft propeller; a second light source formed into a rear facing surface of a blade tip of the aircraft propeller; and an electrical connection established between the coil, the first light source, and the second light source.

14. The system of claim 13 comprising a groove formed into a blade surface on the aircraft propeller, the groove configured to house the electrical connection.

15. The system of claim 13 wherein the first light source is configured to emit light having a different color than is emitted from the second light source.

16. The system of claim 14 wherein the groove is formed into a front facing surface of the aircraft propeller.

* * * * *